United States Patent [19]

Kimoto

[11] 4,435,761
[45] Mar. 6, 1984

[54] DATA PROCESSING APPARATUS CAPABLE OF TRANSFERRING SERIAL DATA WITH SMALL POWER CONSUMPTION

[75] Inventor: Manabu Kimoto, Tokyo, Japan

[73] Assignee: Nippon Electric Co., Ltd., Tokyo, Japan

[21] Appl. No.: 194,874

[22] Filed: Oct. 7, 1980

[30] Foreign Application Priority Data

Oct. 8, 1979 [JP] Japan .................................. 54-129714

[51] Int. Cl.³ ........................ G06F 1/04; G06F 13/00; G11C 7/00
[52] U.S. Cl. ................................................. 364/200
[58] Field of Search ... 364/200 MS File, 900 MS File

[56] References Cited

U.S. PATENT DOCUMENTS 4,137,563 1/1979 Tsunoda .............................. 364/200
4,203,153 5/1980 Boyd .................................. 364/200

OTHER PUBLICATIONS

M6800 Microprocessor Applications Manual, First ed. Motorola Inc., 1975.

Primary Examiner—Gareth D. Shaw
Assistant Examiner—Daniel K. Dorsey
Attorney, Agent, or Firm—Blakely, Sokoloff, Taylor & Zafman

[57] ABSTRACT

In a data processing apparatus comprising a data transmitting and receiving unit for transferring data and a processing unit for processing the data, means is provided for stopping supply of a control clock signal to circuit elements which are in an inoperative state.

10 Claims, 5 Drawing Figures

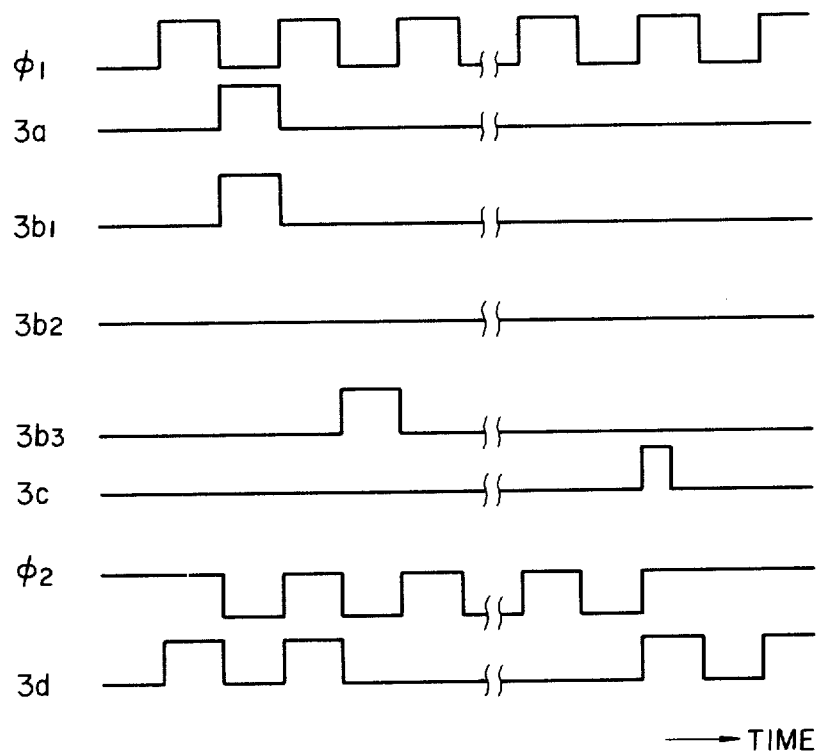

DATA PROCESSING APPARATUS CAPABLE OF TRANSFERRING SERIAL DATA WITH SMALL POWER CONSUMPTION

BACKGROUND OF THE INVENTION

This invention relates to data processing apparatus provided with data transmitting and receiving units.

Data processing apparatus which exchanges data between it and another data processing apparatus and between it and a controller including peripheral apparatus is generally provided with means for converting parallel data into series data so as to transmit and receive data over a single data line, thus decreasing the number of data lines. In most cases, such series data transmitting and receiving units are fabricated as an integrated circuit in the form of an input/output section of a central processing unit (CPU) which processes the parallel data and the input/output circuit is formed on the same substrate as the CPU.

Field of application of such data processing apparatus is very wide and the apparatus is frequently used for such machines and apparatus wherein exchange of source battery can not be made readily. Accordingly, it became necessary to construct all of the data processing apparatus with complementary type field effect transistor circuits capable of operating with a low power consumption and to stop the operation of the apparatus during an interval other than that necessary to process the data thus decreasing the power consumption as far as possible.

However, since the prior art data processing apparatus equipped with series data transmitting and receiving unit operates in synchronism with a fundamental clock pulse such as a system clock pulse while the series data transmitting and receiving unit is operating to transmit and receive the data, transistors in the CPU that constitute the data processing unit are operated by the fundamental clock pulse independently of the program control, thus consuming large power. Since the CPU is constituted by such many circuit elements as a logic arithmetic operation circuit, counters and various registers, when these elements operate independently of the program control, excessive power would be consumed.

Furthermore, in the prior art series data transmission and reception the judgement as to whether the transmission of the data has completed or not is made when the CPU supplies to the data transmitting and receiving unit a transfer completion confirmation signal. For example, such judgement is made by constructing the circuit such that the fundamental clock pulse is constantly supplied to the CPU, and that the content of a shift register, for example, of the transmitting and receiving section adapted to exchange data between it and the CPU, is applied to a counter and that as the counter overflows a flag is operated to apply to the CPU an interruption instruction representing completion of transfer. As a consequence, the capacity of the program is increased for executing the interruption instruction thereby complicating the circuit construction.

SUMMARY OF THE INVENTION

Accordingly, it is an object of this invention to provide improved data processing apparatus capable of transferring series data with a small power consumption.

Another object of this invention is to provide a novel data processing apparatus capable of readily controlling transfer of data.

According to this invention, these and other objects can be accomplished by providing data processing apparatus comprising data processing means for executing an arithmetic operation of data according to a predetermined program, data transfer means set with the data subjected to the arithmetic operation for transferring the data to the outside of the data transfer means, control signal generating means which generates a control signal for controlling the arithmetic operation of the data processing means and a data transfer operation of the data transfer means, and inhibition means for inhibiting application of the control signal to the data processing means when the data transfer means transfers the data.

BRIEF DESCRIPTION OF THE DRAWINGS

In the accompanying drawings:

FIG. 3 is a timing chart showing the operation of the emboidment shown in FIG. 2;

DESCRIPTION OF THE PREFERRED EMBODIMENT

In a series data transmitting and receiving unit, adapted to send data from a transmitting unit to a receiving unit, a transfer initiation signal is sent to a timing pulse generator from a CPU in the transmitting unit and the output of the timing pulse generator is applied not only to a data transmitting and receiving section of the transmitting unit but also to a data transmitting and receiving section of the receiving unit through lines interconnecting the terminals of the transmitting unit and the receiving unit so as to operate synchronously both the data transmitting and receiving units. The data to be transferred from the CPU is parallelly applied to the data transmitting and receiving section of the transmitting unit over a data bus where the data are converted into series data which are supplied to the data transmitting and receiving section of the receiving unit over a line interconnecting the terminals of the transmitting unit and the receiving unit. For example, where 8-bit data are to be transferred, the data transmitting and receiving section is constituted by an 8-bit shift register. The one bit transfer time of the series data is equal to the processing time of one instruction.

Figure 1:
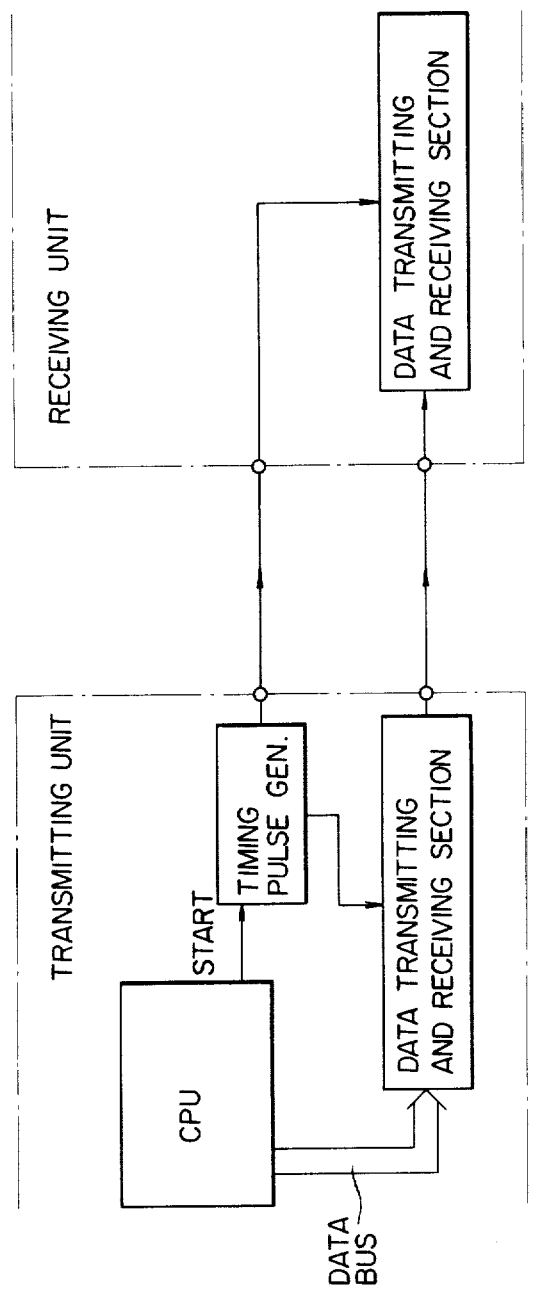
FIG. 1 is a diagrammatic representation of a series data transmitting and receiving unit to which the invention is applied.
Figure 2:
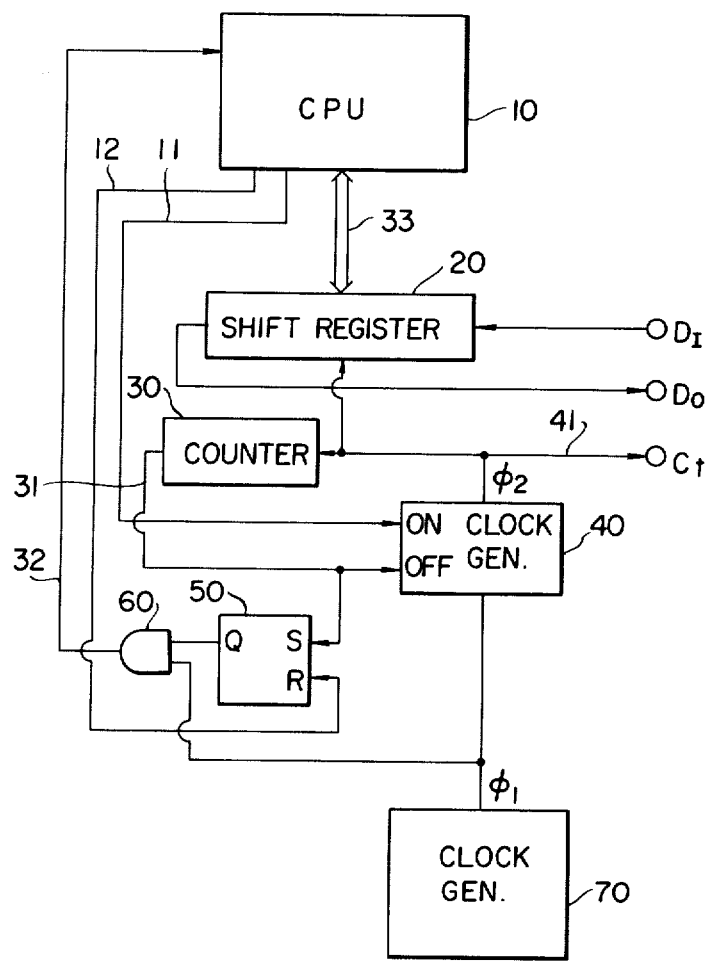
FIG. 2 is a block diagram showing one embodiment according to this invention.

Turning now to FIGS. 2 and 3 showing one embodiment of this invention, the data processing apparatus comprises a central processing unit (CPU) 10 which executes instructions of a program for processing parallel data, a shift register 20 which exchanges series data between CPU 10 and peripheral device or an external processor and operates for temporarily holding data and for effecting parallel—series conversion, a counter 30 which begins to operate from the time of starting data transfer for producing a data transfer completion signal 3c on line 31 after elapse of a predetermined time, a transfer clock generator 40 controlled by a transfer initiation signal 3a on line 11 supplied from CPU 10 and the transfer completion signal 3c supplied from the counter 30 for producing a transfer clock signal $\phi 2$ on line 41, a flip-flop circuit 50 which is reset by a stop signals 3b1 and 3b3 supplied from the CPU 10 through a line 12 and set by the transfer completion signal 3c from the counter 30, a clock generator 70 which generates a fundamental clock pulse $\phi 1$ and an AND gate circuit 60 supplied with the Q output of the flip-flop circuit 50 and the fundamental clock pulse $\phi 1$, the output of the AND gate circuit 60 being utilized as a clock signal on line 32 to control the synchronism of the CPU 10.

The transfer clock signal generator 40 may include a frequency divider, for generating a transfer clock signal having a frequency of ½ of that of the fundamental clock pulse $\phi 1$.

The operation of the circuit shown in FIG. 2 will now be described with reference to the timing chart shown in FIG. 3. More particularly, while the CPU 10 is processing a predetermined arithmetical operation control according to a program data read out from a memory device, not shown, or an instruction generated by the operation of an external key, the flip-flop circuit 50 is in a set state. Accordingly, the AND gate circuit 60 applies to the CPU the clock pulse $\phi 1$ via line 32. Thereafter, when the CPU completes the processing of data and transfers the data to another processor or an external peripheral device the CPU 10 changes the transfer initiation signal 3a to a high level or "1". Furthermore, the CPU 10 supplies parallel data to be transferred to the parallel-series conversion shift register 20 through a bus line 33 comprising a plurality of parallel bit lines. The shift register 20 which has already stored the transfer data receives a transfer clock signal $\phi 2$ on line 41 from the transfer clock signal generator 40 which has been made operative by the data transfer initiation signal 3a to sequentially and serially send out from a data output terminal Do bit after bit of the stored parallel data in synchronism with the transfer clock signal. The transfer clock signal $\phi 2$ can also be used as a clock signal for a device which receives the transferred data through a clock terminal Ct. In response to the input of the transfer clock signal $\phi 2$, the counter 30 begins to count a predetermined number of the transfer clock signals. The counter 30 may be an up counter, a down counter or a shift register so long as it produces a transfer completion signal 3c after elapse of a predetermined interval, which may be selected suitably depending upon the bit length of the data to be transferred. The interval may be of any length that is necessary to complete transfer of the data. In the case of continuous display, for example, after sending the data to the shift register 20, the CPU 10 operates to prepare succeeding data while it is transferring the preceding data to a display device, not shown, if the CPU receives processing information for continuous display but in the absence of the processing information, after transferring the data the CPU 10 waits to receive a response signal from the receiving unit according to the said transferred data. Under these circumstances, the CPU applies a stop signal 3b3 to the reset terminal of the flip-flop circuit 50 over line 12 to set the same. Consequently, the AND gate circuit 60 which is connected to supply the clock pulse $\phi 1$ to the CPU 10 is disabled, with the result that the CPU 10 is rendered inoperative and the power consumption during the data transfer in the CPU 10 containing C-MOS circuits becomes substantially zero.

Where there is a program to be processed by the CPU 10 during data transfer, the stop signal is not produced so that the CPU 10 can process data while transferring data. More particularly, in this embodiment an instruction decoder (not shown) in the CPU 10 produces independent control signals, one being applied to the line 11 for transmitting the transfer initiation signal and the other to the line 12 for transmitting stop signals 3b1 and 3b3. Accordingly, the CPU 10 operates under the following 3 modes.

(1) It stops the program control simultaneously with the initiation of transfer operation.

(2) After the transfer operation has initiated the CPU does not produce a stop instruction and executes the program control together with the data transfer.

(3) During an interval between the initiation of the transfer and the generation of the stop instruction, the CPU executes the program control, and after generation of the stop instruction, the CPU 10 executes only the data transfer operation.

Under the mode (1) the signal "1" on the stop line 12 may be generated simultaneously with the "1" signal on the transfer initiation line 11, so that the same signal may be transmitted over both the lines. In other words, both lines may be used in common or become singular. Where the stop line and the transfer initiation line are provided independently as in this embodiment, the mode (2) can be executed by applying a signal (normally "0") as shown at 3b2 in FIG. 3, to the stop line, while the mode (3) can be executed by supplying a signal as shown at 3b3 in FIG. 3 to the stop line. Of course, the mode (1) can be executed by a signal shown at 3b1 in FIG. 3.

Figure 4A:
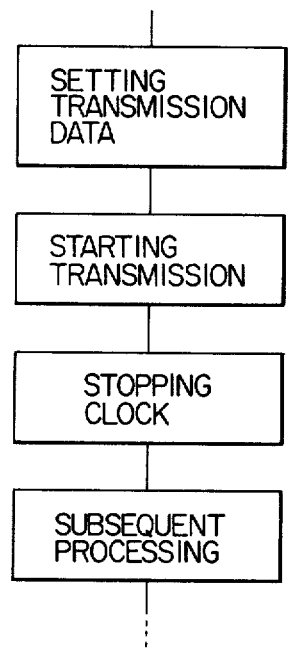
FIGS. 4a and 4b are flow charts respectively showing data transmitting procedures of the embodiment of this invention and of a prior art data transfer apparatus.
Figure 4B:
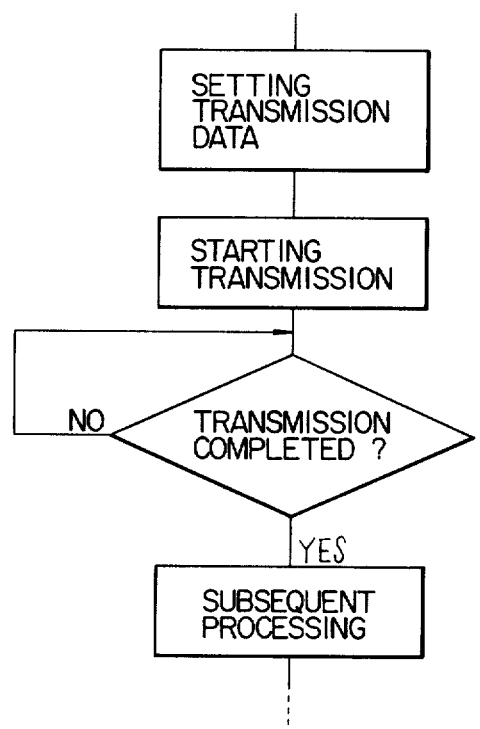

When the counter 30 completes to count a predetermined number of pulses necessary to transfer the data, it produces a transfer completion signal 3c to reset the transfer clock signal generator 40 and to set the flip-flop circuit 50 thus enabling the AND gate circuit 60 which is provided to supply the control clock pulse via line 32 to the CPU 10. Before this time, if the CPU 10 were stopped to operate, it resumes its operation. For this reason, it is not necessary to monitor the state of transmission and reception of the data by applying an interruption instruction to the CPU 10 during the transmission and reception of the series data as in the prior art apparatus, so that immediately after completion of the transmitting and receiving operations it becomes possible to automatically continue the next processing. FIGS. 4a and 4b show flow charts showing the procedures of transmitting and receiving the series data, in which FIG. 4a shows the procedure of the data processing apparatus embodying the invention, while FIG. 4b shows that of the prior art apparatus.

As can be clearly noted from FIG. 4a, according to this embodiment, when the transmission of the data is initiated after the CPU has set the transferred data in the shift register 20, unless a processing is requested, the CPU 10 stops the generation of the clock signal thus stopping data transmission. According to the prior art apparatus, however, as can be noted from FIG. 4b, during the data transfer the CPU is required to constantly send to the data transfer device a signal which judges whether the data transmission has completed or not and to judge the response signal thus increasing not only the power consumption but also the burden of processing of the CPU 10.

As above described, according to this invention, during the data transfer operation, the CPU 10 merely produces the data to be transferred by producing a transfer initiation signal, and thereafter unless a processing is requested, the CPU stops the generation of the clock pulse, thus waiting completion of the data transfer. Upon completion of the data transfer, a clock pulse is automatically supplied to the CPU 10 to readily execute the next processing. Thus, it is possible to reduce the power consumption and the burden of the CPU at the time of data transfer. This eliminates excess control circuits for the data transfer and miniaturizes the processing apparatus. Moreover, it is possible to eliminate a software program for controlling the data transfer, thus saving the memory area.

At the time of inputting data, as the CPU accesses the transfer clock generator 40, series data from a data input terminal DI can be stored in the shift register 20. This also shows that the CPU is not required to control by itself the receiving state. Although in the foregoing description, the series data transmitting and receiving unit was constituted by a shift register 20, a counter 30 and a transfer clock signal generator 40 as shown in FIG. 2, it should be understood that the invention is not limited to such specific construction and that equivalent elements can be used. Furthermore, the data transmitting and receiving unit may be fabricated into a single integrated circuit or incorporated into a central processing unit. Although the transfer clock signal $\phi 2$ is produced according to the fundamental clock pulse $\phi 1$, it may be supplied from outside.

What is claimed is:

1. Data processing apparatus comprising:
   a central processing unit having an arithmetic operation circuit and an output circuit for producing a data transfer initiation signal for designating a start of data transfer,
   transfer means coupled to said central processing unit for transferring data from said central processing unit to a receiving unit,
   a clock pulse generator for generating a clock pulse controlling the arithmetic operation of said central processing unit and said data transfer operation of said transfer means,
   control means coupled to said central processing unit, said transfer means and said clock pulse generator for sending said clock pulse to said transfer means in response to said initiation signal,
   means for sending said clock pulse from said clock pulse generator to said central processing unit,
   inhibiting means coupled to said sending means for inhibiting the sending of said clock pulse to said central processing unit when said transfer means is operating to transfer said data according to said clock pulse, and
   releasing means coupled to said control means for releasing the inhibition of the sending of said clock pulse to said central processing unit upon data transfer termination.

2. The data processing apparatus according to claim 1, wherein said clock pulse generated by said clock pulse generator is sent to said transfer means and said central processing unit through different paths.

3. The data processing apparatus according to claim 2, further comprising, indicating means for indicating termination of the data transfer, wherein said releasing means is activated by said indicating means.

4. Data processing apparatus comprising:
   a data processing means which executes a programmed process and generates a data transfer initiating signal and a signal for halting execution of said programmed process,
   a data transfer means coupled to said data processing means for transferring data processed by said data processing means to a receiving unit,
   a clock pulse generator for generating a clock pulse,
   means for sending said clock pulse to said data processing means,
   a first control means coupled to said sending means for inhibiting the sending of said clock pulse to said data processing means in response to said signal for halting execution,
   a second control means coupled to said data transfer means and said clock pulse generator for sending said clock pulse to said data transfer means in response to said data transfer initiating signal, and
   a third control means coupled to said first control means for sending said clock pulse to said data processing means in response to data transfer termination.

5. The data processing apparatus according to claim 4, wherein said data processing means and said data transfer means are controlled by the same clock pulse so as to operate in synchronism.

6. The data processing apparatus according to claim 4, wherein data from said data processing means are comprised of a plurality of digital bits which are transferred in parallel to said data transfer means, and said data transfer means serially transfers said plurality of parallel bits.

7. Data processing apparatus comprising:
   a central processing unit for processing data,
   a shift register which simultaneously receives said data, each unit of data consisting of a plurality of bits from said central processing unit, and serially transfers said bits to a receiving unit,
   means for generating a clock pulse that controls the processing operation of said central processing unit and shift operation of said shift register,
   means for generating a signal to initiate transfer of said data by said shift register,
   a counter for counting a transfer period according to said clock pulse,
   means for sending said clock pulse to said shift register while said counter is counting during said transfer period,
   means for sending said clock pulse to said central processing unit,
   means for inhibiting the sending of said clock pulse to said central processing unit while said clock pulse is being sent to said shift register, and
   means for controlling said inhibiting means according to an output of said counter means so as to send said clock pulse to said central processing unit in synchronism with data transfer termination.

8. Data processing apparatus formed on a semiconductor chip comprising:
   a central processing circuit for arithmetically processing data according to at least one instruction,
   a data transfer circuit coupled to said central processing circuit and at least one terminal for transferring a processed unit of data to said terminal,
   a clock pulse input circuit for receiving a clock pulse,
   a first supply circuit coupled to said clock pulse input circuit for supplying the received clock pulse to said central processing circuit, a second supply circuit coupled to said clock pulse input circuit for supplying said clock pulse to said data transfer circuit, said first supply circuit and said second supply circuit being formed on said semiconductor chip, a first control circuit coupled to said second supply circuit for controlling said second supply circuit so as to send said clock pulse to said data transfer circuit when said processed unit of data is being transferred by said data transfer circuit, and a second control circuit for controlling said first supply circuit to stop sending said clock pulse to said central processing circuit during at least a part of said data transfer.

9. The data processing apparatus according to claim 8, further comprising on said semiconductor chip at least one control signal output terminal and means for transferring said clock pulse to said control signal output terminal.

10. Data processing apparatus comprising:

a central processing unit for executing an arithmetic logic operation according to a predetermined program, a data transfer unit coupled to said central processing unit for transferring data which is obtained by said central processing unit to a receiving unit, a clock signal supply unit coupled to said central processing unit and said data transfer unit for supplying a clock signal to said central processing unit and said data transfer unit, respectively, and a control unit coupled to said clock signal supply unit for controlling said clock signal supply unit so as to inhibit sending said clock signal to said central processing unit.

* * * * *